H. RAFLOVICH.
TIRE MOLD.
APPLICATION FILED JUNE 30, 1916.
1,209,202.
Patented Dec. 19, 1916.
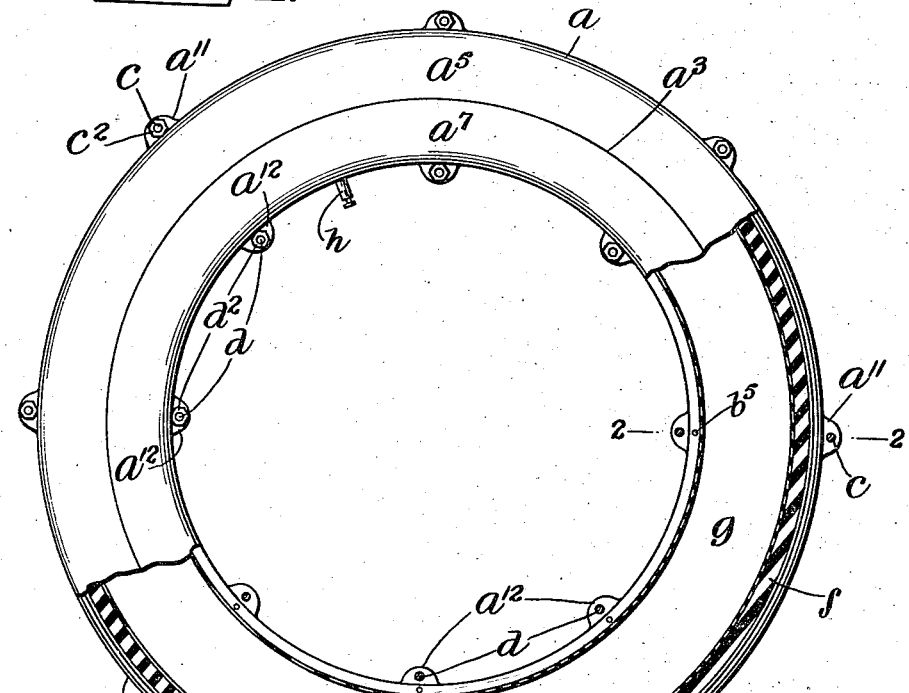
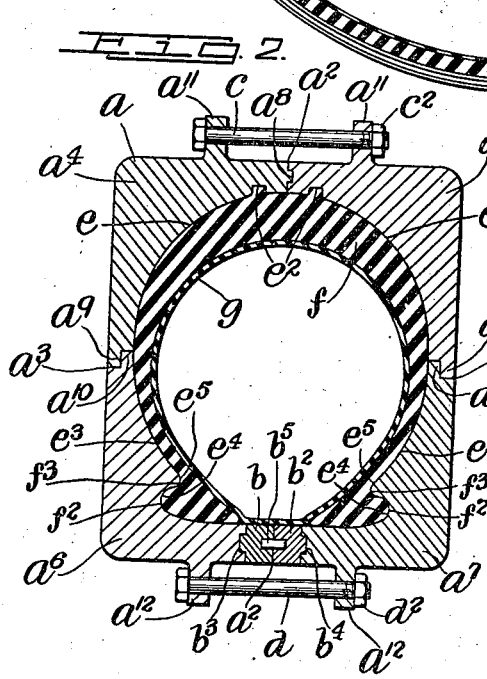
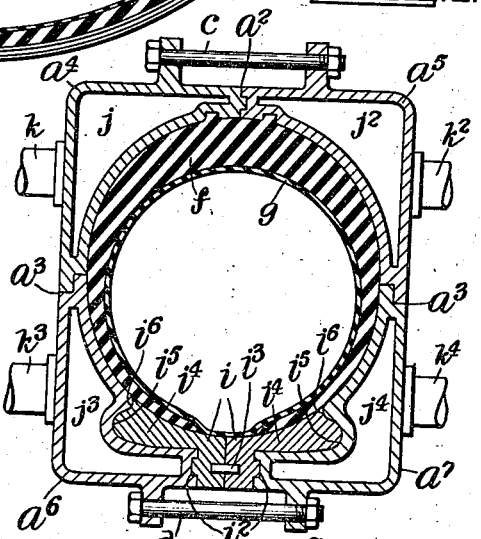
Inventor
Harry Raflovich
By his Attorneys
Edgar Tate & Co

UNITED STATES PATENT OFFICE.

HARRY RAFLOVICH, OF NEW YORK, N. Y.

TIRE-MOLD.

1,209,202. Specification of Letters Patent. Patented Dec. 19, 1916.

Application filed June 30, 1916. Serial No. 106,785.

*To all whom it may concern:*

Be it known that I, HARRY RAFLOVICH, a citizen of the United States, and residing at New York, in the county of New York and State of New York, have invented certain new and useful Improvements in Tire-Molds, of which the following is a specification, such as will enable those skilled in the art to which it appertains to make and use the same.

This invention relates to tire molds and the object thereof is to provide a mold of this class which is composed of separate detachably connected parts and by means of which tires may be more accurately constructed or formed; and a further object is to provide a device of this class which is simple in construction and operation and efficient in use.

The invention is fully disclosed in the following specification, of which the accompanying drawing forms a part, in which the separate parts of my improvement are designated by suitable reference characters in each of the views, and in which:—

Figure 1 is a side partly sectional view of my improved mold indicating the tire therein; Fig. 2 a transverse section on the line 2—2 of Fig. 1 and on an enlarged scale; and, Fig. 3 a view similar to Fig. 2 but showing a modified form of construction.

In Figs. 1 and 2 of the drawing, I have shown at $a$ an annular tire mold split centrally and in the plane thereof as shown at $a^2$, and centrally and concentric to the axis thereof, as shown at $a^3$ to form separate annular parts $a^4$, $a^5$, $a^6$ and $a^7$, the parts $a^4$ and $a^5$ having a tongue and groove connection with each other as shown at $a^8$, while the parts $a^4$ and $a^6$, and $a^5$ and $a^7$ respectively are flanged where they join at $a^3$ as shown at $a^9$ and $a^{10}$, the flanges $a^9$ of the parts $a^4$ and $a^5$ overlapping the flanges $a^{10}$ of the parts $a^6$ and $a^7$.

Placed between the separate parts $a^6$ and $a^7$ are two annular rings $b$—$b^2$ which are detachably connected with the separate parts $a^6$—$a^7$ by a tongue and groove connection $b^3$ and $b^4$, and the rings $b$—$b^2$ are connected with each other by alining pins $b^5$, and the transverse width of the rings $b$—$b^2$ is the same as the transverse width of the adjacent faces of the parts $a^6$ and $a^7$ of the mold.

Formed on the perimeter of the parts $a^4$ and $a^5$ and centrally thereof are a plurality of lugs or projections $a^{11}$ through which are passed bolts $c$ having nuts $c^2$ and by this construction the separate parts $a^4$ and $a^5$ may be drawn and secured together and formed on the inner faces of the parts $a^6$ and $a^7$ of the mold are a plurality of lugs or projections $a^{12}$ which correspond with the lugs or projections $a^{11}$ and through which are passed bolts $d$ having nuts $d^2$ by means of which the separate parts $a^6$ and $a^7$ with the annular rings $b$—$b^2$ therebetween may be drawn and secured together.

The inner faces of the parts $a^4$ and $a^5$ are arc-shaped in form as shown at $e$ and are provided adjacent to the abutting faces thereof with annular grooves $e^2$, and the parts $a^6$ and $a^7$ of the mold are also arc-shaped in form on their inner faces as shown at $e^3$ and are each provided with deep annular grooves $e^4$ which form corresponding annular beads $e^5$.

With the above construction the inner faces of the parts $a^4$, $a^5$, $a^6$ and $a^7$ when secured together, as shown in Fig. 2, form the core of the mold which constitutes the outer dimensions of the tire $f$ when placed therein, the annular grooves $e^4$ and beads $e^5$ forming the corresponding annular beads $f^2$ and grooves $f^3$ of the tire, and placed in the tire $f$ is the usual inner tube or air bag $g$ which is inflated in the usual manner to retain the proper form of the tire $f$ on the inner walls thereof, it being understood that an inflating valve $h$ indicated in Fig. 1 is connected with the tube $g$ and passes between the annular rings $b$—$b^2$ or an aperture formed therebetween. With this construction the parts $a^4$ and $a^6$ are first placed together and laid on a table or suitable support, the annular ring $b$ being placed on the part $a^6$, after which the tire $f$ with the inner tube or bag $g$ therein is placed in the parts $a^4$ and $a^6$, after which the ring $b^2$ is placed on the ring $b$ and the part $a^7$ placed thereon, the bolts $d$ being passed through the lugs or projections $a^{12}$ and the nuts $d^2$ connected with said bolts to draw the separate parts $a^6$—$a^7$ together, after which the part $a^5$ is placed on the parts $a^4$ and $a^7$ and said parts are drawn or secured together by the bolts $c$ and nuts $c^2$. It will be understood, however, that the tire $f$ is made or built up in the usual manner and when placed in position, as hereinbefore described, the mold $a$ may be placed in a suitable vulcanizer in which the tire $f$, or the rubber thereof, is melted and said rubber will be forced into the grooves $e^4$ in the parts $a^6$ and $a^7$ and the grooves $e^2$ in the parts $a^4$ and $a^5$, this process of vulcanizing being old and well known.

In Fig. 3 of the drawing, I have shown a modified form of construction which consists in substituting for the annular rings $b$—$b^2$ other rings $i$ which are detachably connected with the parts $a^6$ and $a^7$ by a tongue and groove construction $i^2$ and are placed in alinement with each other by alining pins $i^3$ and the rings $i$ are provided with extensions $i^4$ having annular beaded portions $i^5$ and annular recessed portions $i^6$, and in this construction the tire $f$, or the inner diameter thereof, is made plain in form or without the beaded and recessed portions $f^2$ and $f^3$ and, as will be seen, the part of the mold which formed said beaded and recessed portions in the tire has been filled in by the extensions $i^4$ of the annular rings $i$. In Fig. 3, I have also shown another modification which consists in forming in the separate parts $a^4$, $a^5$, $a^6$ and $a^7$ of the mold annular ports or passages $j$, $j^2$, $j^3$ and $j^4$ having pipes $k$, $k^2$, $k^3$ and $k^4$ communicating therewith, and by means of this construction steam, hot air or hot water, or the like may be introduced into the chambers $j$, $j^2$, $j^3$ and $j^4$ to vulcanize the tire $f$ placed in the separate parts of the mold when secured together, and with this construction the mold is made compact in form and the tire may be quickly and accurately formed by the improved vulcanizing means.

The improved mold herein shown and described which is composed of separate detachably connected parts, facilitates the manufacture of tires, and such tires may be more perfectly formed in the manufacture thereof by reason of the fact that one of the separate parts of the mold may be detached therefrom for the purpose of examining the tire therein to determine, whether or not, it has been properly formed or the work thereon completed, and by means of the ring constructions $b$, $b^2$ and $i$ tires of different class, or of any desired form may be made in connection with a single mold.

Having fully described my invention, what I claim as new and desire to secure by Letters Patent is:—

1. In a mold for pneumatic tires, an annular casing, said casing being divided centrally and in the plane of the mold and centrally and concentrically to the axis thereof to form separate parts which are detachably connected with each other, means for locking the parts formed by the first division together, and two annular rings placed between the adjacent faces of the inner separate parts of the casing.

2. In a mold for pneumatic tires, an annular casing, said casing being divided centrally and in the plane of the mold and centrally and concentrically to the axis thereof to form separate parts having a tongue and grooved connection, whereby they are detachably connected with each other, annular members placed on the adjacent faces of the inner parts of the casing, and means for locking the parts formed by the first division together.

3. In a mold for pneumatic tires, an annular casing, said casing being divided centrally and in the plane of the mold and centrally and concentrically to the axis thereof to form separate annular parts which have a tongue and grooved connection with each other, and means for locking the separate parts together.

In testimony that I claim the foregoing as my invention I have signed my name in presence of the subscribing witnesses this 28th day of June, 1916.

HARRY RAFLOVICH.

Witnesses:
C. E. MULREANY,
N. E. THOMPSON.